Sept. 26, 1933.                    E. O. COOLEY                    1,928,347
                              COMBINATION GARDEN TOOL
                                Filed Oct. 19, 1932
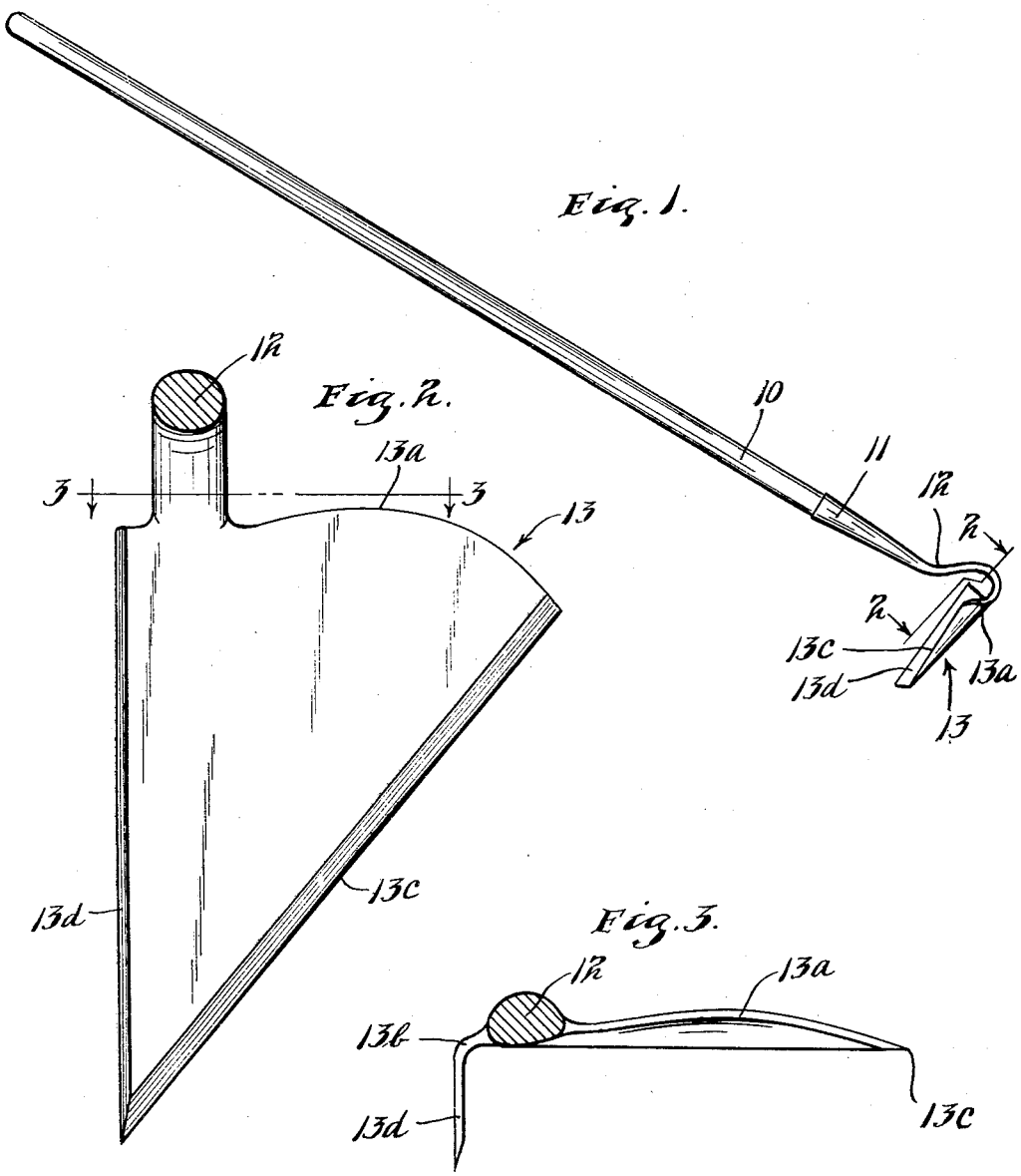
INVENTOR.
ERNEST O. COOLEY.
BY HIS ATTORNEYS.
Williamson & Williamson Patented Sept. 26, 1933

1,928,347

UNITED STATES PATENT OFFICE 1,928,347

COMBINATION GARDEN TOOL

Ernest O. Cooley, Minneapolis, Minn.

Application October 19, 1932. Serial No. 638,506

1 Claim. (Cl. 97—66)

My invention relates to garden tools and particularly to combination hoes.

It is an object of my invention to provide a combination garden tool which may be used as a hoe, a cultivator, a planting tool, a lawn edger, and a dandelion digger.

Another object is to provide such a tool which is inexpensive of manufacture, simple, convenient to use, and light in weight.

These and other objects and advantages of the present invention will more fully appear from the following description, made in connection with the accompanying drawing, wherein like reference characters refer to the same or similar parts throughout the various views, and in which, Fig. 1 is a side view of an embodiment of my invention;

Fig. 2 is a view of the blade and shank portion, shown partially in section, taken along the line 2—2 of Fig. 1 as indicated by the arrows; and Fig. 3 is a sectional view taken along the line 3—3 of Fig. 2, as indicated by the arrows.

Referring to the drawing, my invention includes a handle 10, a ferrule 11, and a curved shank 12, as shown, all of which are of the conventional form used with rakes, hoes, and other garden tools.

A blade 13, formed of plate steel or other suitable material is secured to the outer end of the shank 12 and is disposed substantially in a plane normal to the longitudinal axis of the handle 10. The shape of the main plate of the blade 13 is substantially that of a right triangle, the blade 12 being secured to the outer end of the shank 12 at a point on the shortest edge 13a of the blade adjacent the vertex of the right angle. The edge 13b extends away from the shank 12 in a plane substantially normal to the longitudinal axis of the handle 10. The shortest edge 13a of the triangular blade 13 instead of being straight is of convex curvature. The upper portion of the blade is dished somewhat as shown best in Fig. 3.

From the medium lengthed edge 13b of the main plate of the blade 13, a narrow, substantially rectangular side plate 13d extends rearwardly, that is, toward the handle 10, at substantially right angles to the main portion of the blade and is constructed integrally therewith. The rearward or free longitudinal edge of the rectangular side plate 13d, the lower edge of the side plate 13d, and the edge 13c of the main plate of the blade 13 are each sharpened as shown.

In operation my combination garden tool may be used as a hoe, planting tool, cultivator, lawn edger, or dandelion digger.

When used as an ordinary hoe the handle portion is so grasped that the hypotenuse-like edge 13c of the blade 13 is lowermost and the tool is then manipulated in the same manner as conventional forms of hoes.

When used as a planting tool, my garden tool is held in the position shown in the drawing. The pointed lower end of the blade is forced into the ground, is moved a short distance substantially parallel to the surface of the ground, and is withdrawn, thus forming a hole into which seeds may be dropped.

When used as a cultivator my device is held in the position shown in the drawing and is manipulated in the same manner as conventional forms of hand operated cultivators.

In use as a lawn edger, my device is held in the position in which it is shown in the drawing with the side plate 13d disposed parallel to and in contact with the side surface of the sidewalk along which the edging operation is to be performed. The tool is then moved in successive short chopping strokes directed parallel to the edge of the sidewalk and at a slight angle with respect to the surface of the ground. The depth of the groove cut is dependent upon the downward pressure exerted on the tool and the angle at which the main plate is disposed with respect to the surface of the ground.

In using my device as a dandelion digger it is held in the position shown in the drawing and is swung downwardly to cut or chop off the root of the dandelion plant after which it is pulled upwardly at a suitable angle to pull out the plant.

It is obvious that my combination garden tool may be used for other purposes than those specifically mentioned and described.

It is apparent that I have invented a novel, simple, inexpensive and light combination garden tool which may be used to conveniently and effectively perform the functions of a number of commonly used single purpose garden tools.

It will, of course, be understood that various changes may be made in the form, details, arrangement and proportions of the various parts without departing from the scope of the present invention.

What is claimed is:—

In a garden tool, a head in the form of a substantially triangular plate having a pair of angular corners for working the soil, the edge of said plate between said corners being sharpened, the central portion of said plate adjacent said shapened edge being concave, and an elongated handle connected to said plate adjacent the third corner thereof and extending substantially normal to said plate in an outward direction with respect to the concave side of said plate whereby said handle will be substantially symmetrically disposed with respect to said sharpened edge and each of said angular corners when the same are respectively disposed lowermost for working the soil.

ERNEST O. COOLEY.